United States Patent
Fukuda et al.

[11] 3,855,166
[45] Dec. 17, 1974

[54] BINDER RESINS FOR ELECTRON PHOTOGRAPHY AND THE LIKE AND METHOD OF PRODUCTIVE THEREOF

[75] Inventors: Makoto Fukuda, Sagamihara; Tatsuo Nakano; Ikuji Kishi, both of Tokyo, all of Japan

[73] Assignees: Canon Kabushiki Kaisha; Denki Kagaku Kogyo Kabushiki Kaisha, both of Tokyo, Japan

[22] Filed: Oct. 26, 1973

[21] Appl. No.: 409,787

[52] U.S. Cl. ... 260/28.5 R, 260/28.5 A, 252/62.1 P
[51] Int. Cl. ........................ C08f 45/52, G03g 9/02
[58] Field of Search .......... 252/62.1 P; 260/28.5 R, 260/28.5 A, 33.6 UA

[56] References Cited
UNITED STATES PATENTS

| | | | |
|---|---|---|---|
| 3,165,420 | 1/1965 | Schutzmer | 252/62.1 P |
| 3,416,942 | 12/1968 | Schutzner | 260/28.5 R |
| 3,577,345 | 5/1971 | Jacknow | 252/62.1 P |
| 3,681,107 | 8/1972 | Moriconi | 252/62.1 P |

*Primary Examiner*—Morris Liebman
*Assistant Examiner*—S. L. Fox
*Attorney, Agent, or Firm*—Fitzpatrick, Cella, Harper & Scinto

[57] ABSTRACT

Resin Compositions comprising 30 to 85% by weight of polystyrene and/or styrene copolymers, 5 to 68% by weight of chlorinated paraffins having at least 30% by weight chlorine content, and 2 to 24% by weight of at least one aromatic compound selected from those having the following formulae:

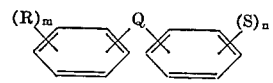

(I)

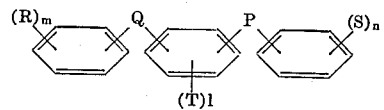

(II)

wherein P and Q are alkylene; R, S, and T are hydrogen or alkyl; and $l$, $m$, and $n$ are positive integer. The resin compositions are usable in paint, ink, and the like, and are particularly useful in preparing toner for use in electrophotography, such as by dispersing coloring agents therein.

22 Claims, No Drawings

BINDER RESINS FOR ELECTRON PHOTOGRAPHY AND THE LIKE AND METHOD OF PRODUCTION THEREOF

BACKGROUND OF THE INVENTION

1. Field of the Invention

This invention relates to resin compositions usable in paints, inks, toner for electrophotography, and the like and processes for production of the resin compositions. More particularly, this invention provides an excellent resin composition for toner which is used in developing electrostatic latent images in electrophotography, electrostatic printing, facsimile, and the like and processes for producing such resin compositions.

2. Description of the Prior Art

Heretofore, chargeable fine particles for use in developing electrostatic latent images in electrophotography (toner) and the like have been produced by dispersing pigments and/or dye stuffs in a wide variety of natural or synthetic resins and grinding the colored resins thus obtained to form fine particles of about 5 to 50 $\mu$ diameter. These toners when mixed with glass beads, iron powder, natural fur, and the like are charged positively or negatively through friction charging and thus they are used as the developing agent.

Binder resins hitherto used as a resin for toner exhibits a slight negative polarity in the aforementioned carrier, but it is very difficult to derive satisfactorily a sufficient chargeability as well as fixability and grinding-ability in preparing toner from the conventional resin binder. Thus, materials for improving chargeability such as gilsonite, metal containing dye stuffs, and the like have been incorporated into resins to prepare resin binders for toner.

When chargeability of toner is imparted by a charge controlling compound such as dye stuff, ununiform chargeability of toner occurs, and causes decreasing in image intensity and fog. Since it is considerably difficult to disperse uniformly a charge controlling material such as dye in each toner particle, it is desired that the resin per se possesses high chargeability. If binder resin for toner possesses a sufficient chargeability, each toner particle exhibits uniform chargeability and thus there is obtained sharp images which are of high image intensity and fogless.

Moreover, since it is not necessary to use colored charge controlling materials such as dye stuffs, toner of high pure color can be obtained.

Recently there has been growing a demand for increases in copying speed and thus fixability of toner has become important. That is, since toner is melted by heating and fixed, increases in copying speed result in shortness of heating periods and, thus, the toner is insufficiently fixed. In this case, increasing the temperature of fixing unit might be considered, which, however, causes burning and sometimes firing of an image receiving sheet and it is dangerous.

Accordingly, as the binder resin for toner, those that are excellent in fixability, and capable of melting in a short heating period, fixing on an image receiving sheet, are desired.

SUMMARY OF THE INVENTION

This invention provides resin compositions which are usable in electrophotography, electrostatic printing, electrostatic coating, and the like and which are particularly useful as a resin for toner for use in developing electrostatic latent images because of excellent negative chargeability and excellent fixability thereof.

That is, this invention provides resin compositions, particularly useful as a resin for toner in electrophotography, which comprise 5 to 68% by weight, preferably 10 to 55% by weight of chlorinated paraffins having a bouned chlorine content of at least 30% by weight (hereinafter referred to as chlorinated paraffin); 30 to 85% by weight, preferably 40 to 70% by weight of at least one resin selected from the group of polystyrene or styrene copolymers containing styrene of more than 50% by weight which are miscible with the chlorinated paraffin (hereinafter referred to as tyrene containing polymer); and 2 to 24% by weight, preferably 5 to 20% by weight of at least one compound selected from the compounds represented by the following formulae (I) and (II) (hereinafter referred to as aromatic compound):

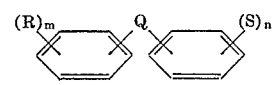
(I)

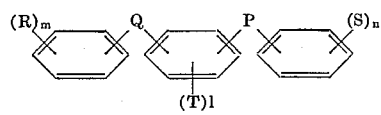
(II)

wherein P and Q are a straight or branched alkylene group having 1 to 10 carbon atoms; R, S, and T are hydrogen or an alkyl group having 1 to 10 carbon atoms; and $l$ is an integer of 1 to 4, and $m$ and $n$ are an integer of 1 to 5.

DESCRIPTION OF THE PREFERRED EMBODIMENT

The first component of the present resin composition, i.e. chlorinated paraffins are produced by chlorination of paraffins and have 14 to 50 carbon atoms. Melting point of the chlorinated paraffin varies depending upon the chlorine content thereof. Thus, the chlorine content of the chlorinated paraffin of this invention is not less than 30% by weight based upon the total weight of the chlorinated paraffin, with the range of 50 to 75% by weight being preferred.

The second component of the present resin composition is a styrene containing polymer.

The reason that the chlorinated paraffins and styrene containing polymers are used in this invention is that the use of resins immiscible with the chlorinated paraffins results in a black coloration during developing, whereby no sharp image can be obtained.

The ratios of the chlorinated paraffin and the styrene containing polymer should range from 5 to 68% by weight and from 85 to 30% by weight, respectively, based upon the total weight of the resin composition. Effect of friction charging cannot be expected if the ratios thereof are outside the above-defined ranges. When the amount of the chlorinated paraffin is over 80% by weight, good images are obtained, but the toner thus prepared becomes finely pulverized by mechanical force in repeated developings, resulting in gradual decreasing in sharpness of images formed.

The third component of the present resin composition, i.e. typical aromatic compounds represented by the formula (I) and/or the formula (II) includes the following compound. Formula (I): diphenyl ethane, diphenyl propane, diphenyl heptane, diphenyl hexane, 4-ethyl-diphenyl ethane, 4-n-butyl diphenyl ethane, 4,4-dimethyl diphenyl ethane, 4,4'-dimethyl diphenyl propane, 4-n-butyl asym-diphenyl propane.

Formula (II): p-di-$\beta$-phenthyl benzene, -phenethyl -phenethyl benzene, p-di-$\beta$-phenyl butyl benzene, 3,5-bis [$\beta$-(m-tolyl) ethyl] toluene, 3,5-bis ($\alpha$-methyl benzyl) toluene.

They are used singly or in admixture with each other.

The aromatic compound greatly affects the melt-adherent characteristics of the resin composition which has a close relation with fixability and mass-forming properties of the toner. Taking the fact into account, the total weight of chlorinated paraffins and resins miscible therewith has been specified to 76 to 98% by weight based upon the total weight of the resin composition and thus the aromatic compound should be in the range of 2 to 24% by weight.

If the amount of the aromatic compound is less than 2% by weight, fixability is poor, and when it goes beyond 24% by weight, the resin composition undesirably melts and forms masses at room temperature.

The aforementioned three components of this invention are prepared previously and are blended with a mixer such as a roll mill, extruder, kneader, and the like.

Alternatively, the following is a preferred method of preparing the present resin composition: chlorinated paraffin and aromatic compound are dissolved in styrene monomer or mixture of styrene monomer and copolymerizable monomers therewith, which is suspended in water and polymerized in the presence of an ordinary polymerization initiator such as benzoyl peroxide, lauroyl peroxide, cumene hydroperoxide, t-butyl peroxybenzoate, azobisisobutyronitrile, and the like in an amount of about 0.1 to 3% by weight based on the total weight of all the monomers, whereby there is obtained a resin composition of the present invention.

The representative monomers copolymerizable with styrene monomer are as follows: styrene derivatives such as $\alpha$-methyl styrene, o-, m-, and p-bromo styrene, chloro styrene, fluoro styrene, 2,5-dichloro styrene, 2,5-dibromo styrene, 2,5-difluoro styrene, o-, m-, and p-ethyl styrene, vinyl naphthalene, and the like; nitriles such as acrylonitrile, methacrylonitrile, methyl acrylate, ethyl acrylate, n-butyl acrylate and the like; esters of unsaturated organic acids such as methyl methacrylate, ethyl methacrylate, n-butyl acrylate, di-ethyl methacrylate, di-ethyl itaconate, and the like; and like compounds such as 1,3-butadiene, 2-chloro-1,3-butadiene, vinyl chloride, vinylidene chloride, and the like.

The polymerization is carried out at temperatures of 50° to 130°C, preferably 70° to 100°C. The polymerization period is generally 4 to 24 hours and it may be, if necessary, extended. The preferred dispersing agents include poval (polyvinylalcohol), methyl cellulose, and the like. A small amount of surface active agents may be, if desired, used as an auxiliary agent. The dispersing agent is preferably used in an amount of about 0.005 to 0.5% by weight based upon the amount of water.

The volumetric ratio of a uniform solution of styrene monomer or mixture of styrene monomer and copolymerizable monomers therewith, chlorinated paraffin, and aromatic compound to water is generally one-fifth to one-half. If it is over one-half, suspended particles form masses, preventing the suspension from polymerization. Since, in particular, the resin composition contains th aromatic compounds of high plasticizability, the particles readily form masses at relatively low polymerization temperatures. A more stable dispersion of particles is obtained with increasing in the proportion of water, but is is not economical from the standpoint of operation. Thus it is preferred that the above ratio is not less than one-fifth.

Since the properties of the product are adversely affected by the monomers and dispersing agents remaining therein, it is preferred that the polymerization is carried out as completely as possible and that after polymerization the resin particles are sufficiently washed and dried. The resin composition thus prepared in colorless or extremely faint yellow-tinged transparent fine beaded one having low softing point. When the resin composition is melted and formed into a film, the resulting film is even and has no fish-eye.

In case the resin composition of the present invention is obtained through suspension polymerization, chlorinated paraffin functions as a chain transfer agent and thus controls the molecular weight of styrene containing polymer. Moreover, there are obtained polymers in which styrene containing polymer is grafted with chlorinated paraffin. In this case, the degree of grafting is given by the ratio of styrene containing polymer (S.C.P.) to chlorinated paraffin (C.P.), S.C.P./C.P. which is 1 to 300. Accordingly it will be appreciated that the aforementioned method of preparing the present resin composition by polymerizing styrene monomer and mixture of styrene monomer and copolymerizable monomers therewith in situ is preferred as compared to the method of merely blending the individual component to prepare the present resin composition in that the resin composition of higher miscibility and uniformity is obtained.

Furthermore, the resin composition prepared through bulk polymerization is undesirably colored, and in the case of emulsion polymerization the emulsifier undesirably causes coloration and deteriorates the chargeability of toner.

Overall conversion in the following examples is calculated from the results obtained by measuring the monomers remaining in the resin composition by gas chromatography. The viscosity of the resin composition is measured in conventional manner at 30°C using toluene as a solvent and intrinsic viscosity [$\eta$] is determined by extrapolation. Softing point of the resin composition is measured according to the Ring and Ball Test of E-28-58T, ASTM.

To 100 parts of the present resin composition is added 3 to 15 parts, preferably 4 to 10 parts of pigments, if necessary, in admixture with dye stuffs to prepare toner. The toner is desired to be as fine as possible and particles having diameters of below 100 $\mu$, preferably about 5 to 30 $\mu$ are generally used.

This invention provides, as mentioned above, resin compositions for toner which comprises chlorinated paraffins, resins miscible with the chlorinated paraffins, and aromatic compounds. A resin composition wherein the aromatic compound is replaced with dioctyl phthalate, diethyl phthalate, triphenyl phosphate, tricresyl phosphate and the like exhibits low negative electrostatic potential to iron, whereby sharp images cannot be obtained. Moreover, it has been found that paraffin is not good with regard to miscibility and plasticizability, thereby deteriorating fixability.

Although this invention is explained above referring to toner in electrophotography, it should be understood that the resin composition of this invention is usable in other usages, such as paint, ink, and the like.

In the examples, melt-adherent point of the resin composition is indicated. Although the melt-adherent point is not the fixing temperature of toner itself, there is a relationship between melt-adherent point and fixability at low temperatures. Therefore it will be appreciated that a lower melt-adherent point indicates better fixability.

The melt-adherent point of the resin composition is measured as follows: the resin composition powder is placed in an oven, which is gradually heated and the temperature in the oven at which the resin composition powder begins to stick is determined as the melt-adherent point of the resin composition.

Electrostatic potential is measured as follows: a sample to be measured is coated on an about 100 cm$^2$ iron plate, which is set obliquely and iron powder is dropped on the thus-coated iron plate. Electrostatic potential generated on the coat by friction is measured with an E-1401 Surface Potential Indicator (supplied by Kobayashi Riken K.K.).

Electrostatic potential of polystyrene to iron powder is −73V as measured with the above method.

The toner prepared using the present resin composition exhibits negative electrostatic potential to iron powder of 2 to 10 times that of the conventional styrene resin.

Furthermore, the toner can be fixed at low temperatures, and is not adversely affected by humidity and sharp images can be obtained, and copying speed can be improved.

All the per cents and parts herein are by weight.

The following examples are given to facilitate the understanding of this invention.

EXAMPLE 1

Chlorinated paraffin having a chlorine content of 70%, polystyrene and diphenyl butane in the amounts as shown in Table 1 were uniformly mixed with a roll mill at a temperature of 100° to 160°C to prepare each of 400g of resin compositions. After finely grinding the resulting composition, 7 parts of carbon black was mixed with 100 parts of the resin composition, which was further kneaded with a roll mill at a temperature of 120° to 140°C for 5 minutes. The composition was cooled, crushed with a hammer mill, and further ground with a ball mill for 96 hours to produce toner powder passing through 325 mesh.

425g of iron powder, as a carrier, was mixed with 75g of toner to prepare a developer. The resulting developer was applied to an electrophotographic copying machine (NP 1100 supplied by Canon K.K.) to determine the properties of the toner. The temperature of a fixing unit was adjusted to 160° to 190°C. The presence of unfixed or remaining toner powder and the roughness of images were observed by touching the images with finger and thus the fixability was determined.

The results are given in Table 1.

Table 1.

| Run No. | Polystyrene (%) | Chlorinated paraffin having a bound chlorine content of 70% (%) | Diphenyl butane (%) | Melt adherent point (°C) | Fixability | Electrostatic potential (V) |
| --- | --- | --- | --- | --- | --- | --- |
| 1 | 50 | 50 | 0 | 82 | bad | −380 |
| 2 | 49.5 | 49.5 | 1 | 80 | do. | −380 |
| 3 | 47.5 | 47.5 | 5 | 70 | good | −377 |
| 4 | 45 | 45 | 10 | 61 | do. | −372 |
| 5 | 42.5 | 42.5 | 15 | 52 | do. | −364 |
| 6 | 40 | 40 | 20 | 40 | do. | −360 |
| 7 | 37.5 | 37.5 | 25 | room temperature | impossible to be powdered | not determined |

EXAMPLE 2

Chlorinated paraffin having a chlorine content of 50% by weight, acrylonitrile-styrene copolymer, and p-di-β-phenethyl benzene in the amounts as shown in Table 2 were admixed as in Example 1 to prepare samples numbered Run Nos. 8 to 12.

Toners were produced using the above samples according to the same method as in Example 1 and were tested.

The results are shown in Table 2.

Table 2.

| Run No. | Acrylonitrile-styrene copolymer (%) | Chlorinated paraffin having a bound chlorine content of 50% by weight (%) | p-di-β-phenethyl benzene (%) | Melt adherent point (°C) | Fixability | Electrostatic potential (V) |
| --- | --- | --- | --- | --- | --- | --- |
| 8 | 60 | 40 | 0 | 85 | bad | −265 |
| 9 | 57 | 38 | 5 | 73 | good | −262 |
| 10 | 54 | 36 | 10 | 64 | do. | −248 |
| 11 | 51 | 34 | 15 | 52 | do. | −240 |
| 12 | 45 | 30 | 25 | room temperature | impossible to be powdered | not determined |

EXAMPLE 3

Using chlorinated paraffin having a chlorine content or 70% by weight, polystyrene, and various kinds of aromatic compounds in the amounts as shown in Table 3, toners were prepared in the same manner as in Example 1 and were tested. Sharp images were obtained with each sample. Fixability of each sample is shown in Table 3.

Table 3.

| Run No. | Styrene resin | Chlorinated paraffin having a bound chlorine content of 70% by weight | Aromatic compounds (%) | | Melt adherent point (°C) | Fixability | Electrostatic potential (V) |
|---|---|---|---|---|---|---|---|
| 1 | 50 | 50 | | | 82 | bad | -380 |
| 13 | 45 | 45 | diphenyl hexane | 10 | 60 | good | -374 |
| 14 | 45 | 45 | 4-n-butyl diphenylethane | 10 | 57 | " | -372 |
| 15 | 45 | 45 | 4,4'-diethyl diphenylethane | 10 | 64 | " | -368 |
| 16 | 45 | 45 | 4,4'-dimethyl diphenylpropane | 10 | 55 | " | -372 |
| 17 | 45 | 45 | diphenyl butane | 5 | 62 | " | -373 |
|   |    |    | 4-n-butyl diphenyl butane | 5 |    |    |      |
| 18 | 45 | 45 | p-diphenyl ethyl benzene | 5 |    |    |      |
|   |    |    | m-diphenyl ethyl benzene | 5 | 58 | " | -371 |
| 19 | 45 | 45 | 3,5-bis($\beta$-(m-tolyl) ethyl) toluen | 10 | 58 | good | -373 |
| 20 | 45 | 45 | 3,5-bis($\alpha$-methyl benzene toluen | 10 | 55 | " | -372 |

EXAMPLE 4

550g of styrene monomer, 400g of a 70% by weight chlorinated paraffin, and 50g of diphenyl butane were mixed in nitrogen atmospher while maintained at 60°C to prepare a homogeneous solution. In the resulting homogeneous solution was dissolved 6g of benzoyl peroxide, which was then dispersed with stirring in nitrogen atmosphere in 3l of distilled water in which 0.1% by weight of poval was dissolved, in a 5l-stainless steel autoclave equipped with a stirring means. The polymerization was carried out at 90°C for 9 hours. The conversion was 97%.

Colorless, transparent beaded resin composition with an average diameter of 0.2 mm was obtained. $[\eta]$ was 0.196 dl/g; softing point was 120°C; and electrostatic potential was −373V.

100 parts of the resin composition was melted and mixed with 7 parts of carbon black, which was after cooling crushed with a hammer mill and then ground with a ball mill for 96 hours to prepare toner powder passing through 325 mesh.

425g of iron powder, as a carrier, was mixed with 75g of powdered toner to prepare a developer. The properties of the toner were measured with an electrophotographic copying machine (NP-1100 supplied by Canon K.K.). Re-producibility of original images were excellent and no scattering of toner onto white background was detected. Furthermore, unfixed toner powder was not observed by finger touch and there was no roughness of surface. Thus it has been conformed that the toner was excellent.

EXAMPLE 5

580g of styrene monomer, 160g of acrylonitrile monomer, 60g of methyl methacrylate monomer, 100g of a 50 wt percent chlorinated paraffin, and 110g of 3,5-bis $\beta$-(m-tolyl) ethyl toluene were heated to 60°C and mixed to prepare a homogeneous solution. 4g of azobisisobutylonitrile was dissolved in the homogeneous solution, which was then polymerized as in Example 4 at 75°C for 22 hours. The conversion was 99.5%.

Slightly yellow-tinged transparent beaded resin composition with an average diameter of 0.3 mm was obtained. $[\eta]$ was 0.358 dl/g, and softing point was 115°C.

The resin composition thus prepared was used as a material for toner of electrophotography with the same results as in Example 4.

20 parts of the resin composition was dissolved in 80 parts of toluene to produce a varnish. 88 parts of the varnish formed was mixed with 12 parts of Titanium White, whereby there was obtained a white paint which exhibited excellent characteristics at low temperatures.

EXAMPLE 6

300g of styrene monomer, 50g of $\alpha$-methyl styrene monomer, 600g of a 70 wt percent chlorinated paraffin, and 50g of 4,4'-di-methyl diphenyl propane were mixed at 60°C to prepare a homogeneous solution. In the homogeneous solution thus prepared was dissolved 7g of benzoyl peroxide, which was polymerized at 95°C for 6 hours as in Example 4. The conversion was 98.5%.

Colorless, transparent beaded resin composition having an average diameter of 0.2 mm was obtained: $[\eta]$, 0.089 dl/g; softing point, 105°C; and electrostatic potential, −420V.

The resulting resin composition was used as a resin for toner of electrophotography as in Example 4.

On compounding 10 parts of the resin composition and 100 parts of SBR rubber, the tackiness of SBR rubber was improved.

EXAMPLE 7

700g of styrene monomer, 100g of a 30 wt percent chlorinated paraffin, and 200g of p-di$\beta$-phenethyl benzene was mixed at 60°C to prepare a homogeneous solution. In the homogeneous solution were dissolved 3.5g of benzoyl peroxide and 0.35g of t-butyl peroxy benzoate, which was dispersed with stirring in 2l of distilled water in which 0.02% of poval was dissolved and in which 5g of fine powder potassium phosphate was dissolved, in a 5l -stainless steel autoclave equipped with a stirrer. The polymerization was carried out at 80°C for 18 hours and further at 120°C for 3 hours. The conversion was 99.8%.

Colorless, transparent beaded resin composition with an average diameter of 0.2 mm was obtained: [$\eta$], 0.328 dl/g; softing point, 115°C.

The resin composition thus prepared was used as a resin for toner of electrophotography as in Example 4.

A varnish was produced by dissolving 5 parts of the resin composition in 100 parts of toluene. The varnish when combined with various pigments was used as gravure ink of bright color.

EXAMPLE 8

500g of styrene monomer, 400g of 70 wt percent chlorinated paraffin, and 100g of 3,5-bis ($\alpha$-methyl benzyl) toluene were mixed at 60°C in nitrogen atmosphere to prepare a homogeneous solution. In the homogeneous solution was dissolved 8g of benzoyl peroxide, which was then dispersed in nitrogen atmosphere in 3l of distilled water in which 0.05% of poval was dissolved, in 5l -stainless steel autoclave equipped with a stirrer. The polymerization was carried out at 90°C for 10 hours. The conversion was 98.4%.

Colorless, transparent beaded resin composition with and average diameter of 0.4 mm was obtained: [$\eta$], 0.156 dl/g; softing point, 120°C; and electrostatic potential, −385V.

With the toner prepared using the resin composition thus formed, excellent re-producibility of original images was obtained, and no scattering of toner powder onto the white background was detected. Moreover, unfixed or remaining toner powder was not detected and roughness of image surface was not observed.

EXAMPLE 9

When 100g of a sample prepared in Example 4 was fractionated using a toluene-methanol-cyclohexane mixture, the following four fractions were obtained.

| Fraction No. | % (by weight) | Chlorine cointent (%) | Note |
|---|---|---|---|
| 1 | 41.7 | 1.2 | |
| 2 | 15.3 | 5.8 | |
| 3 | 37.8 | 70.0 | |
| 4 | 5.2 | 0.1 | Solvent soluble portion is evaporated to dryness |

Infrared analysis showed that Fraction No. 1 comprised substantially polystyrene, Fraction No. 3 comprised substantially chlorinated paraffin and Fraction No. 2 comprised the compound in which chlorinated paraffin was chemically bound to polystyrene.

EXAMPLE 10

10g of the sample prepared in Example 8 was placed in a Soxlet's extractor and extracted with n-propyl alcohol under reflux at 97°C for 24 hours. The extracted solvent phase was condensed and a methanol insoluble fraction was precipitated. The chlorine content of the fraction was 70.2% by weight and it was substantially pure chlorinated paraffin (theoretical value; 70.0%).

The amount of the extracted chlorinated paraffin was 1.6g and it was 40.0% by weight based upon the total amount of chlorinated paraffin.

According, it is considered that the remaining 60.0% by weight of chlorinated paraffin was grafted to polystyrene.

What is claimed is:

1. A resin composition comprising 30 to 85% by weight of at least one polymer selected from the group consisting of polystyrene and copolymers of styrene-vinyl unsaturated monomers, 5 to 68% by weight of chlorinated paraffins having at least 30% by weight bound chlorine content, and 2 to 24% by weight of at least one aromatic compound represented by the formula:

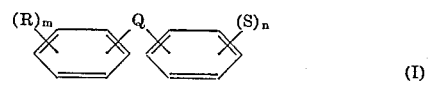

(I)

and aromatic compounds represented by the formula:

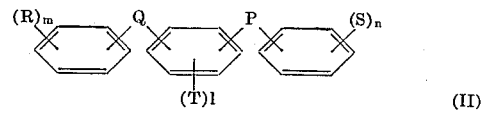

(II)

wherein P and Q are an alkylene group; R, S and T are hydrogen or an alkyl group; and $l$, $m$ and $n$ are a positive integer.

2. A resin composition according to claim 1 wherein said copolymer of styrene-vinyl unsaturated monomer comprises at least 50% by weight styrene.

3. A resin composition according to claim 1 wherein said polymer comprises 40 to 70% by weight of the resin composition.

4. A resin composition according to claim 1 wherein the bound chlorine content of the chlorinated paraffin is 50 to 75% by weight based upon the total weight of the chlorinated paraffin.

5. A resin composition according to claim 1 wherein the chlorinated paraffin comprises 10 to 55% by weight of the resin composition.

6. A resin composition according to claim 1 wherein the aromatic compounds represented by the formula (I) and/or the aromatic compounds represented by the formula (LL) comprise 5 to 20% by weight of the resin composition.

7. A resin composition according to claim 1 wherein said polymer and said chlorinated paraffins are chemically bound.

8. A process for producing resin compositions which comprises mixing a styrene monomer or a mixture of styrene and at least one vinyl-unsaturated comonomer, chlorinated paraffins having at least 30% by weight bound chlorine content, and at least one aromatic compound represented by the formula:

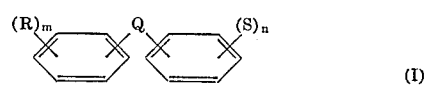

(I)

and aromatic compound represented by the formula:

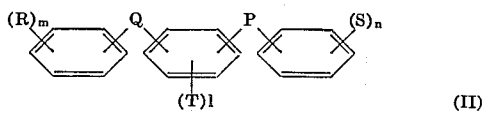

(II)

dispersing the resulting mixture in water, the volumetric ratio of the resulting mixture to water being 1:2 to 1:5, and subjecting the dispersion to polymerization.

9. A process for producing resin compositions according to claim 8 wherein the polymerization is carried out at temperatures of 50° to 130°C.

10. A process for producing resin compositions according to claim 8 wherein the mixture of styrene and at least one vinyl-unsaturated comonomer contains at least 50% by weight styrene.

11. A process for producing resin compositions which comprises mixing 30 to 85% by weight of at least one polymer selected from the group consisting of polystyrene and, copolymers of styrene-vinyl unsaturated monomers, 5 to 68% by weight of chlorinated paraffins having at least 30% by weight bound chlorine content, and at least one aromatic compound represented by the formula:

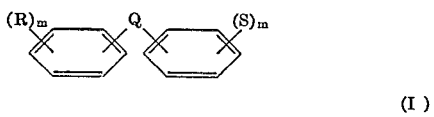

(I)

and aromatic compounds represented by the formula:

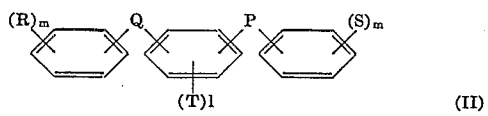

(II)

and kneading the mixture.

12. A toner for electrophotography comprising the resin composition of claim 1 and coloring agents dispersed in said resin composition, the ration of them being 3 to 15 parts coloring agent to 100 parts of the resin composition.

13. A toner for electrophotography comprising the resin composition of claim 2 and coloring agents dispersed in the resin composition, the ratio of them being 3 to 15 parts of the coloring agent to 100 parts of the resin composition.

14. A toner for electrophotography comprising the resin composition of claim 3 and coloring agents dispersed in the resin composition, the ratio of them being 3 to 15 parts of the coloring agents to 100 parts of the resin composition.

15. A toner for electrophotography comprising the resin composition of claim 4 and coloring agents dispersed in the resin composition, the ration of them being 3 to 15 parts of the coloring agents to 100 parts of the resin composition.

16. A toner for electrophotography comprising the resin composition of claim 5 and coloring agents dispersed in the resin composition, the ratio of them being 3 to 15 parts of the coloring agents to 100 parts of the resin composition.

17. A toner for electrophotography comprising the resin composition of claim 6 and coloring agents dispersed in the resin composition, the ratio of them being 3 to 15 parts of the coloring agents to 100 parts of the resin composition.

18. A toner for electrophotography comprising the resin composition of claim 7 and coloring agents dispersed in the resin composition, the ratio of them being 3 to 15 parts of the coloring agents to 100 parts of the resin composition.

19. A toner for electrophotography comprising the resin composition produced according to the method of claim 8 and coloring agents dispersed in the resin composition, the ratio of them being 3 to 15 parts of the coloring agent to 100 parts of the resin composition.

20. A toner for electrophotography comprising the resin composition produced according to the method of claim 9 and coloring agents dispersed in the resin composition, the ratio of them being 3 to 15 parts of the coloring agent to 100 parts of the resin composition.

21. A toner for electrophotography comprising the resin composition produced according to the method of claim 10 and coloring agents dispersed in the resin composition, the ratio of them being 3 to 15 parts of the coloring agent to 100 parts of the resin composition.

22. A toner for electrophotography comprising the resin composition produced according to the method of claim 11 and coloring agents dispersed in the resin composition, the ratio of them being 3 to 15 parts of the coloring agent to 100 parts of the resin composition.

* * * * *